July 5, 1927. E. M. HEWLETT ET AL Re. 16,667
MEANS FOR REPRODUCING POSITION
Original Filed Aug. 2, 1923
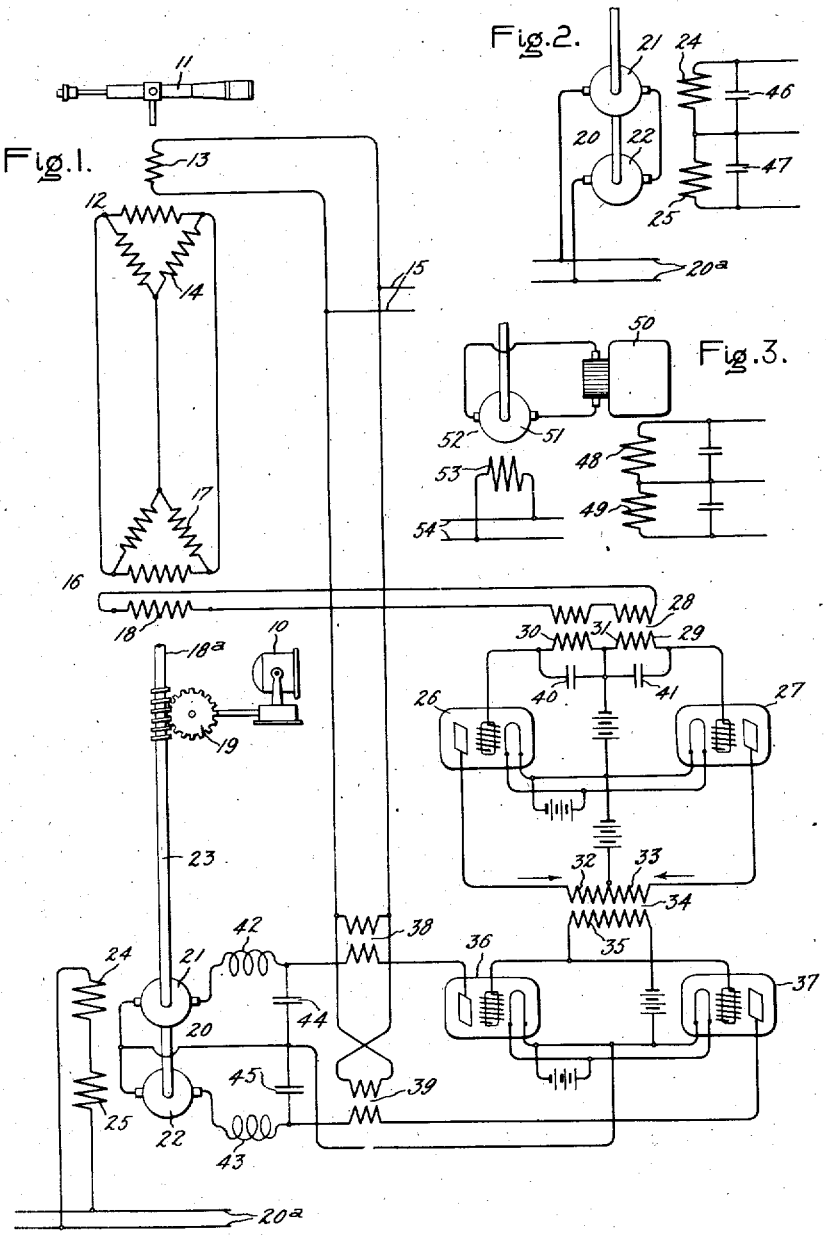
Inventor:
Edward M. Hewlett,
Waldo W. Willard,
by [signature]
Their Attorney.

Reissued July 5, 1927. Re. 16,667

UNITED STATES PATENT OFFICE.

EDWARD M. HEWLETT AND WALDO W. WILLARD, OF SCHENECTADY, NEW YORK, ASSIGNORS TO GENERAL ELECTRIC COMPANY, A CORPORATION OF NEW YORK.

MEANS FOR REPRODUCING POSITION.

Original No. 1,547,392, dated July 28, 1925, Serial No. 655,359, filed August 2, 1923. Application for reissue filed May 10, 1927. Serial No. 190,355.

This invention relates to means for reproducing position, and has for its object the provision of simple, reliable and efficient means for maintaining an object in positional agreement with a controlling object.

More specifically our invention relates to systems for reproducing position in which the motion of a controlling object is utilized through suitable mechanism to control a remote servo motor so as to cause the servo motor to drive a second or controlled object into positional agreement with the first.

In carrying out our invention in one form, we provide means for producing an electromotive force which is substantially proportional in amount and direction to any positional disagreement between the two objects, together with means responsive to this electromotive force for controlling the driving motor for the driven object.

For a better understanding of our invention reference should be had to the accompanying drawing, Fig. 1 of which shows in diagrammatic form means for reproducing position embodying our invention, while Figs. 2 and 3 are modified forms of our invention.

Referring to the drawing, we have shown our invention in one form as applied to the automatic controlling of the position of a remote searchlight 10 so as to maintain the searchlight in a predetermined angular relation with a controlling object which is shown as a telescope 11. It is desired, for example, to automatically move the searchlight so that it is directed on the object at which the telescope is pointed. Operatively connected to the telescope 11 is an inductive device 12 comprising in the form shown a field winding 13 rotatably mounted and driven by movement of the telescope in a horizontal plane or in azimuth, and a stationary polycircuit armature winding 14 shown as a three-phase distributed winding. The field winding 13 is energized from a suitable source of alternating current 15. Operatively connected to the searchlight 10 in such manner as to be responsive to its movement in azimuth is a second inductive device 16 similar in construction to the device 12. This second inductive device comprises a three-phase armature winding 17 and a winding 18 which is rotatably mounted and has its shaft 18[a] operatively connected through suitable gearing 19 to the searchlight 10 so as to be moved in response to movement of the searchlight in azimuth. The windings 13 and 18 are preferably connected to be rotated in 1:1 ratios with the telescope and searchlight respectively.

The inductive devices 12 and 16 are of the type often used for transmitting angular motion. In the present application, however, the inductive devices are used for producing an alternating electromotive force which has a value dependent on the angular disagreement in azimuth of the telescope and searchlight and which has a direction with respect to the alternating current supply source 15 determined by the direction of this disagreement. The devices are connected to the telescope and searchlight in such manner that when the searchlight is in angular agreement with the telescope, as shown in the drawing, the winding 18 is in a position with relation to armature winding 17 which is at right angles to the position of the field winding 13 with relation to armature winding 14. In this position of winding 18, it is at right angles to the field generated by armature winding 17 due to energy supplied to it from inductive device 12. It will be observed that field winding 13 induces a set of voltages in the various circuits of its cooperating armature winding 14, which set of voltages are impressed on armature winding 17 whereby a field is set up by winding 17 having a direction corresponding to the direction of the field set up by field winding 13 so that it does not cut winding 18 when in the position shown and hence no voltage is induced therein. In case of angular disagreement of winding 18 with respect to winding 13 it will be observed that a voltage will be induced in winding 18 which voltage will be substantially proportional in value to the amount of angular disagreement and will have a direction with respect to alterating current supply source 15 determined by the direction of the angular disagreement.

It will be understood that any rotation of the field winding 13, due to movement of the telescope in azimuth, produces a corresponding rotation of the field produced by the armature winding 17. In other words, the field of winding 17 is caused to rotate in accordance with the movements of the telescope, and upon such rotation of this field relative to winding 18 the aforesaid voltage is induced in the winding 18 by reason of the fact that the field is an alternating one.

The searchlight 10 is driven in azimuth by an electric driving motor 20 of a direct current type which motor is controlled in response to the voltage induced in winding 18 so as to maintain the searchlight in angular agreement with the telescope. The motor 20 is shown as provided with two armatures 21 and 22 on a common driving shaft 23, the armatures being provided with field windings 24 and 25. The field windings are connected in series to a source of direct current supply 20[a]. As shown, shaft 23 is a continuation of shaft 18[a] and is connected through gearing 19 to the searchlight.

For the control of the motor 20 the electromotive force induced in winding 18 upon angular disagreement of the telescope and the searchlight is impressed on the input or grid circuits of two electron discharge amplifying devices or tubes 26 and 27, shown as of the three electrode type. This connection is preferably effected through a transformer 28, the secondary 29 of which is provided with a central tap so that one half 30 of the secondary is connected in the input or grid circuit of tube 26 while the other half 31 is connected in the input circuit of tube 27. The output or plate circuits of the tubes are connected to the two halves 32 and 33 of the primary of a transformer 34 having a secondary winding 35. The two tubes 26 and 27 are thus connected in a push pull or two wave circuit so as to reproduce both halves of the electromotive force wave induced in winding 18 and thus impress an alternating voltage on transformer 34. The purpose of tubes 26 and 27 is to amplify the power output of the winding 18 so that only the very slight load required to control the grids of the tubes is applied to the winding 18.

This amplified output of winding 18 is impressed in turn on the grid or input circuits of two electron discharge devices or tubes 36 and 37, also shown of the three electrode type, the entire voltage of the secondary of the transformer 34 being impressed on the grids of both tubes. The plate circuits of the tubes 36 and 37 are energized from the alternating current supply source 15 through suitable transformers 38 and 39, the connections of the transformers being such that their voltages are opposite in direction so that at any given instant the plates of the tubes 36 and 37 have opposite polarities. The armature 21 is connected in the plate circuit of tube 36 while the armature 22 is connected in the plate circuit of tube 37.

As thus connected, it will be observed that when transformer 34 impresses a voltage on the grids of tubes 36 and 37 due to movement of the telescope, one or the other of the armatures 21 or 22 will be energized depending on the polarity of the output of transformer 34. For example, if the polarity of transformer 34 is such that the grid of tube 36 is positive at the same instant that its plate is positive, then a current will flow through armature 21, causing motor 20 to operate in one direction, whereby the searchlight will be driven to follow the telescope. When the searchlight reaches angular agreement with the telescope resulting in zero voltage across the terminals of winding 18, and hence zero voltage impressed by transformer 34, no current will flow in armature 21 and the motor will come to rest. Upon movement of the telescope in the opposite direction, transformer 34 will impress a voltage having the opposite direction, that is, displaced 180 degrees in phase, on tubes 36 and 37 whereby the grid of tube 37 will be positive at the same instant that its plate is positive, so that a current will be caused to flow in armature 22 and the motor 20 operated in the opposite direction until the searchlight is again brought into angular agreement with the telescope.

To improve the operation, condensers 40 and 41 are connected across the two halves 30 and 31 of transformer secondary winding 29.

Inductance coils 42 and 43 are connected in series with the armatures 21 and 22 respectively for the purpose of increasing the inductance of the armature circuits. This increased inductance of the armature circuits tends to flatten out the pulsating currents supplied thereto from the electron tubes, thereby improving the operation of the motor. A condenser 44 is connected across armature 21 and coil 42, while a condenser 45 is similarly connected across armature 22 and coil 43. The function of these condensers is to absorb voltage surges due to the inductance of the armature circuits.

In the modified form of our invention shown in Fig. 2, the armatures are connected in series across the supply source, while the field coils 24 and 25 are energized from the vacuum tubes. Obviously a motor having a single armature and differential field coils may be used. Condensers 46 and 47 are connected across the field coils respectively to absorb voltage surges due to the self inductance of the field coils, thus preventing arcing and smoothing out the current flow in the field circuits.

As shown in Fig. 3, for the purpose of further amplification, the electron tubes may be connectd to selectively energize differential field coils 48 and 49 of an electric generator 50, which in turn supplies amplified power to the armature 51 of the electric driving motor 52 for the searchlight. The field coil 53 of the motor is connected across a suitable supply source 54. Obviously if further amplification is desired, a plurality of generators 50 may be used connected so that the armature of one energizes the field of the next.

While we have described our invention as embodied in concrete form and as operating in a specific manner in accordance with the provisions of the patent statutes, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States is:—

1. Means for reproducing position comprising in combination with a controlling object and a driven object, a driving motor for said driven object, means for producing an electromotive force upon positional disagreement of said objects corresponding in value and direction to the amount and direction of said positional disagreement, and power amplifying means responsive to said electromotive force for controlling said motor whereby said motor is caused to drive said driven object into positional agreement with said controlling object.

2. Means for reproducing position comprising in combination with a controlling object and a driven object, driving means for said driven object, means for producing an alternating electromotive force upon angular disagreement of said objects having a direction determined by the direction of such angular disagreement, and power amplifying means responsive to said electromotive force arranged to selectively apply its amplified output to control said motor in accordance with the direction of said electromotive force, whereby said motor is caused to drive said driven object into positional agreement with said controlling object.

3. Means for reproducing position comprising in combination with a controlling object and a driven object remote from said controlling object, a driving motor for said driven object, means for producing an alternating magnetic field rotating in accordance with the movements of said controlling object, a coil inductively associated with said field in which an electromotive force is induced by said field, control means responsive to said electromotive force for starting said motor upon angular movement of said controlling object, and means for changing the angular relation of said field and said coil in accordance with the movements of said driven object whereby said voltage is varied to stop said motor when said driven object is moved into positional agreement with the controlling object.

4. Means for reproducing position comprising in combination with a controlling object and a driven object, an inductive device provided with polycircuit armature and single circuit field windings, one of said windings being rotatably mounted, a driving connection between said controlling object and said rotatable winding, a source of alternating current supply for said field winding, a second inductive device provided with similar windings, a driving connection between said driven object and the rotatable winding of said second device, electrical connections between the armature windings of said devices whereby an electromotive force is induced in the field winding of said second device upon angular disagreement of said objects, a motor for driving said driven object, and control means for said motor responsive to said electromotive force to cause the motor to drive said driven object into positional agreement with said controlling object.

5. Means for reproducing position comprising in combination with a controlling object and a driven object remote from said controlling object, a driving motor for said driven object, means driven by said controlling object for producing an alternating magnetic field rotating in accordance with the movements of the controlling object, a coil in said field mechanically connected to said driven object so as to be rotated in said field in accordance with the movements of said driven object whereby an electromotive force is induced in said coil varying in value and direction in accordance with the angular disagreement of said objects, and control means for said motor responsive to said electromotive force to cause the motor to drive the driven object into positional agreement with the controlling object.

6. Means for reproducing position comprising in combination with a controlling object and a driven object, a driving motor for said driven object, means for producing an electromotive force upon positional disagreement of said objects corresponding in value and direction to the amount and direction of such positional disagreement, and means comprising electron discharge devices responsive to said electromotive force for controlling said motor to drive said driven object into positional agreement with said controlling object.

7. Means for reproducing position comprising in combination with a controlling object and a driven object, a driving motor for said driven object, means for producing an electromotive force upon positional disagreement of said objects corresponding in value and direction to the amount and direction of said positional disagreement, and electron discharge devices controlled by said electromotive force and connected to control the energization of said motor so as to cause said motor to drive the driven object into positional agreement with the controlling object.

8. Means for reproducing position comprising in combination with a controlling object and a driven object, an electric driving motor for said driven object, inductive means for producing an electromotive force upon positional disagreement of said objects corresponding in value and direction to the amount and direction of said positional disagreement, and a plurality of electron discharge devices for amplifying the output of said inductive means and connected to control the energization of said motor so as to cause said motor to drive the driven object into positional agreement with the controlling object.

9. Means for reproducing position comprising in combination with a controlling object and a driven object, driving means for said driven object, two electron discharge amplifying devices for controlling said driving means, a source of alternating current supply connected to energize the plate output-circuits of said devices in opposite directions, and means for impressing a voltage on the input circuits of said devices having a direction corresponding to the polarity of one or the other of the plates of said devices depending on the direction of the angular disagreement between said objects, whereby energy is supplied by one or the other of said devices to cause the driven object to be driven into angular agreement with the controlling object.

10. Means for reproducing position comprising in combination with a controlling object and a driven object, an electric driving motor for said driven object, inductive means for producing an electromotive force upon positional disagreement of said objects corresponding in value and direction to the amount and direction of said positional disagreement, a source of alternating current supply for said inductive means, and a plurality of electron discharge amplifying devices having their input circuits energized by said inductive means and their output circuits energized in opposite directions from said supply source and connected to control said motor, whereby energy is supplied from one or the other of said devices depending on the direction of the angular disagreement between said objects to cause said motor to drive the driven object into angular agreement with the controlling object.

11. Means for reproducing position comprising in combination with a controlling object and a driven object, an electric driving motor for said driven object, an inductive device connected to said controlling object having a polycircuit armature winding and a cooperating field winding, a source of alternating current supply for said field winding, an inductive device having similar windings operatively connected to said driven object, electrical connections between the armature windings of said devices whereby an electromagnetic field is produced by the armature winding of said second device having a definite angular relation to the angular position of said controlling object and inducing an electromotive force in the field winding of said second device corresponding in value and direction to the amount and direction of the angular disagreement between said objects, and a plurality of electron discharge devices having their input circuits controlled in response to said electromotive force and their output circuits connected to control said motor, and electrical connections between the output circuits of said devices and said alternating current supply source such that voltages of opposite direction are impressed on said output circuits, whereby said motor is controlled by one device to drive said driven object in one direction and by another device to drive the driven object in a reverse direction in accordance with the direction of the electromotive force impressed on the input circuits of said devices so as to drive said driven object into positional agreement with said controlling object.

12. Means for reproducing position comprising in combination with a controlling object and a driven object, means for producing an electromotive force upon positional disagreement of said objects corresponding in value and direction to the amount and direction of such positional disagreement, a plurality of electron discharge devices having their input circuits energized by said electromotive force, a driving motor for said driven object, an electric generator for supplying energy to said motor, a plurality of field windings for said generator, and electrical connections between said fields and the output circuits of said electron discharge devices.

13. Means for reproducing position comprising in combination with a controlling object and a driven object, inductive means for producing an electromotive force upon positional disagreement of said objects corresponding in value and direction to the amount and direction of such positional disagreement, a source of alternating current supply for said inductive means, two electron discharge devices having their input circuits energized by said inductive means and their output circuits energized in opposite directions from said supply source, a driving motor for said controlled object, an electric generator for supplying energy to said motor, a plurality of field windings for said generator, and electrical connections between said field windings and the output circuits of said electron discharge devices.

In witness whereof, we have hereunto set our hands this 9th day of May 1927.

EDWARD M. HEWLETT.
WALDO W. WILLARD.